(12) United States Patent
Matsumoto et al.

(10) Patent No.: US 7,314,361 B2
(45) Date of Patent: Jan. 1, 2008

(54) SPLIT TYPE VULCANIZING MOLD

(75) Inventors: Yoshio Matsumoto, Chikugo (JP); Kenichirou Hosaka, Saga (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/564,999

(22) PCT Filed: Jul. 20, 2004

(86) PCT No.: PCT/JP2004/010378

§ 371 (c)(1), (2), (4) Date: Aug. 7, 2006

(87) PCT Pub. No.: WO2005/007376

PCT Pub. Date: Jan. 27, 2005

(65) Prior Publication Data

US 2007/0042065 A1    Feb. 22, 2007

(30) Foreign Application Priority Data

Jul. 18, 2003    (JP)    ............................. 2003-199328

(51) Int. Cl.
    *B29C 35/02*    (2006.01)
(52) U.S. Cl. ..................................... 425/46
(58) Field of Classification Search ................. 425/46, 425/47
    See application file for complete search history.

(56) References Cited

U.S. PATENT DOCUMENTS 3,897,181 A * 7/1975 Madaschefsky ............... 425/46
3,922,122 A * 11/1975 Bottasso et al. ............... 425/46
4,883,415 A * 11/1989 Salvadori ...................... 425/46
5,208,044 A * 5/1993 Miyata et al. ................ 425/46

FOREIGN PATENT DOCUMENTS

| JP | 2-214620 A | 8/1990 |
| JP | 2000-127173 A | 5/2000 |
| JP | 2001-205634 A | 7/2001 |

* cited by examiner

*Primary Examiner*—James Mackey
(74) *Attorney, Agent, or Firm*—Sughrue Mion, PLLC

(57) ABSTRACT

With a split-type vulcanizing mold, a proper clamping force of the mold is obtained without carrying out shim adjustment. A lower washer (16), disc springs (17), and an upper washer (18) are inserted into each of a plurality of cylindrical holes (15) defined on the circumference of a spacer ring (14). A spacer ring (14) provides an outer ring (8) with a pre-load so as to be tightened up by a bolt (12), so that the outer ring (8) can be smoothly moved without backlash in the axial direction thereof all the time. Selection is made on the disc springs (17) having a load such that a proper clamping force is obtained when a deflection of the disc springs (17) is equivalent to half a deflection at the time of the maximum load of the disc springs (17), and regardless of whether variation in dimensions, at the time of fabricating the mold, is on the plus side or minus side, the variation in dimensions is absorbed to thereby clamp the respective sector molds (6) with a proper clamping force. As the sector molds (6) are caused to undergo reduction in diameter, the spacer ring (14) is pushed down by the bolster plate (9) to thereby descend, causing the disc springs (17) to undergo gradual deflection, so that the clamping force applied to the sector molds (6) is increased.

4 Claims, 7 Drawing Sheets

SPLIT TYPE VULCANIZING MOLD

TECHNICAL FIELD

The invention relates to a split-type vulcanizing mold for vulcanizing a tire and so forth, and more particularly, to a split-type vulcanizing mold capable of eliminating the need for adjustment with a shim to compensate for insufficiency in a clamping force of mold, due to variation in mold dimensions.

BACKGROUND TECHNOLOGY

FIG. 6 shows a conventional split-type vulcanizing mold although not disclosed in Patent Document. As shown in FIG. 6, a lower side mold 2 is fixed on the top of a lower platen 1, and a molding recess 2A is formed on the top surface of the lower side mold 2. An upper platen 3 is provided above the lower platen 1, and an upper side mold 4 is fixed to the underside surface of the upper platen 3 with a plurality of bolts (not shown). Further, a molding recess 4A is formed on the underside surface of the upper side mold 4. A cylinder (not shown) in vertical posture is provided above the upper platen 3, and an operation of the cylinder causes the upper platen 3 to move vertically to cause the upper side mold 4 to approach and part from the lower side mold 2. A segment mold ring 5 ring-like in shape as a whole is disposed radially outer sides of the upper side mold 4 and the lower side mold 2. The segment mold ring 5 comprises sector molds 6 arc-like in shape divided in, for example, 9 pieces in the circumferential direction thereof, and sector segments 7 divided similarly in 9 pieces in the circumferential direction thereof, fixed to the radially outer sides of the respective sector molds 6, and a molding recess 6A is formed on the inner surfaces of the respective sector molds 6. The top surfaces of the respective sector segments 7 are movably supported by the underside surface of the upper platen 3, extending radially outer side of the upper side mold 4.

When the respective sector segments 7 are moved radially inwardly, and the respective sector molds 6 integral with the respective sector segments 7 come to be in close contact with the respective peripheries of the upper side mold 4 and the lower side mold 2, a vulcanization space where a tire is housed to be vulcanized is formed by the sector molds 6, the upper side mold 4, and the lower side mold 2.

An outer ring 8 annular in shape, surrounding the sector segments 7 is disposed on the radially outer side of the sector segments 7, and the upper end of the outer ring 8 is fixed to the underside of an outer end of a bolster plate 9 of a vulcanizer with a bolt 11, and with a spacer ring 10 interposed therebetween. The spacer ring 10 is fixed to the top surface 8C of the outer ring 8 with a bolt 12. The bolster plate 9 is moved vertically by an elevating mechanism (not shown) to thereby cause the outer ring 8 to move in the axial directions thereof, as shown by the arrows A and B. A sloping face 8A inwardly sloping from the bottom to the top is formed on the inner periphery of the outer ring 8. A sloping face 7A identical in gradient to the sloping face 8A of the outer ring 8 is formed on the outer peripheries of the respective sector segments 7, and the sloping face 7A and the sloping face 8A are linked together with dovetail groove joints so as to be slidably engaged with each other.

Accordingly, upon the outer ring 8 moving vertically relative to the upper platen 3, the respective sector segments 7 are moved radially inwardly or outwardly, by a wedging action of the sloping faces 7A and the sloping face 8A, in synchronization with each other while being guided by the upper platen 3. A green tire is housed in the vulcanization space to be vulcanized by causing a vulcanizing medium at a high temperature and high pressure to act thereon.

In order to prevent occurrence of gaps among the upper side mold 4, the lower side mold 2, and the respective sector molds 6 due to an internal pressure of the vulcanizing medium, thereby creating a cause for spewing of rubber, the upper platen 3 and the bolster plate 9 are pushed down in the direction of the arrow A (downward in the axial direction) with a predetermined force during vulcanization, thereby causing a predetermined clamping force to act on the upper side mold 4, the lower side mold 2, and the respective sector molds 6.

With the conventional split-type vulcanizing mold shown in FIG. 6, if, for example, the kind of tire to be produced is changed, there occurs the need for reassembling the mold into another mold. As described hereinbefore, the mold is made up by stacking the respective sector molds 6 and the respective sector segments 7 radially outwardly of the upper side mold 4 and the lower side mold 2, so, even if the respective sector molds 6 and the respective sector segments 7 are fabricated within predetermined dimensional tolerances in the radial direction, there occurs variation in dimensions in the radial direction, due to piling-up of the dimensional tolerances. Also, respective dimensions of the sector segments 7 and the outer ring 8 in the axial direction thereof, as well as the sloping face 7A and the sloping face 8A have fabrication tolerances. Accordingly, there occurs insufficiency in a clamping force of the outer ring 8, acting on the respective sector molds 6, thereby creating a cause for spewing of rubber.

With the conventional split-type vulcanizing mold, as a countermeasure for preventing the spewing of tire rubber, a shim 13 with an appropriate thickness is sandwiched between the underside surface 9A of the bolster plate 9 and the top surface 10A of the spacer ring 10, (hereinafter referred to as shim adjustment), to be tightened up with a bolt 11, as shown in FIG. 7, thereby absorbing the dimensional errors of the mold and so forth, by adjusting an extensional dimension of the outer ring 8 from the underside surface 9A of the bolster plate 9, so as to prevent insufficiency in the clamping force.

Further, in order to prevent the spewing of rubber as a result of the molding recesses of the respective sector molds coming into contact with a tire prior to the respective sector molds coming to be in close contact with the respective peripheries of the upper side mold and the lower side mold, causing rubber of the tire to flow into gaps of tight-contact parts, there has been developed a tire vulcanizing mold die (Patent Document 1: refer to JP 2000-102927 A) wherein there are disposed movable pieces used for blocking the gaps of the tight-contact parts prior to the respective sector molds coming to be in close contact with the respective peripheries of the upper side mold and the lower side mold.

With the conventional mold for executing the shim adjustment described as above, since the shim adjustment is made after occurrence of the spewing of rubber of a tire, problems have been encountered in that there occur the needs for reworking due to poor appearance of the tire with the spewing of rubber occurring thereto, stopping production in a vulcanization process until completion of the shim adjustment, increasing the number of process steps for making the shim adjustment, and so forth.

Further with the tire vulcanizing mold die as disclosed in Patent Document 1, the spewing of rubber of a tire in the middle of the step of clamping the mold can be prevented, however, as it is impossible to eliminate conditions of insufficiency in a camping force of the mold, a problem has been unavoidable in that rise in internal pressure of the vulcanizing medium during vulcanization causes butting parts of the sector molds to open up, resulting in occurrence of the spewing of the rubber out of the butting parts.

In view of those problems, the invention has been developed, and it is a first object of the invention to obtain an proper clamping force of a mold without the need for the shim adjustment.

It is a second object of the invention to cause an outer ring to move smoothly accompanying movement of a bolster plate.

DISCLOSURE OF THE INVENTION

In accordance with a first aspect of the invention, there is provided a split-type vulcanizing mold comprising a lower side mold, an upper side mold capable of approaching and parting from the lower side mold, a segment mold ring comprising a plurality of segments arc-like in shape, capable of moving in a radial direction thereof, and coming into close, i.e. tight contact with the upper side mold and the lower side mold upon the segments moving toward the radially inner side, an outer ring provided on the radially outer side of the segment mold ring, so as to be movable in the axial direction thereof, for causing the segment mold ring to move , a bolster plate for causing the outer ring to move in the axial direction thereof through a spacer ring, wherein the spacer ring is slidably installed on the top surface of the outer ring through urging members having an urging force substantially equivalent to a clamping force of the mold at the time of vulcanization.

In accordance with a second aspect of the invention, there is provided the split-type vulcanizing mold according to the first aspect of the invention wherein the urging members are preferably provided with a predetermined pre-load.

In accordance with a third aspect of the invention, there is provided the split-type vulcanizing mold according to the first of the second aspect of the invention wherein urging members are preferably set such that the proper mold clamping force of the mold is provided when a deflection thereof is approximately half a deflection thereof at the time of the maximum load.

According to the first aspect of the invention, because the outer ring is pushed down with the spacer ring through the urging members, fabrication variation in mold dimensions is absorbed by the agency of deflection of the urging members without execution of shim adjustment, and the mold can be clamped with an proper clamping force, so that it is possible to prevent spewing of tire rubber.

According to the second aspect of the invention, the spacer ring is installed by providing the urging members with a pre-load relative to the outer ring, so that the bolster plate, the spacer ring, and the outer ring can be smoothly moved in unison without backlash in the axial direction all the time.

According to the third aspect of the invention, the urging members are set to provide proper clamping force when a deflection of the urging members is approximately half of the maximum deflection thereof, so that it becomes possible to absorb variation in dimensions regardless of whether the variation in dimensions, at the time of fabricating the mold, is on a plus side or minus side to thereby clamp the respective sector molds with the proper clamping force, preferably set such that the proper mold clamping force of the mold is provided when a deflection thereof is approximately half a deflection thereof at the time of the maximum load.

BEST MODE FOR CARRYING OUT THE INVENTION

Figure 1:
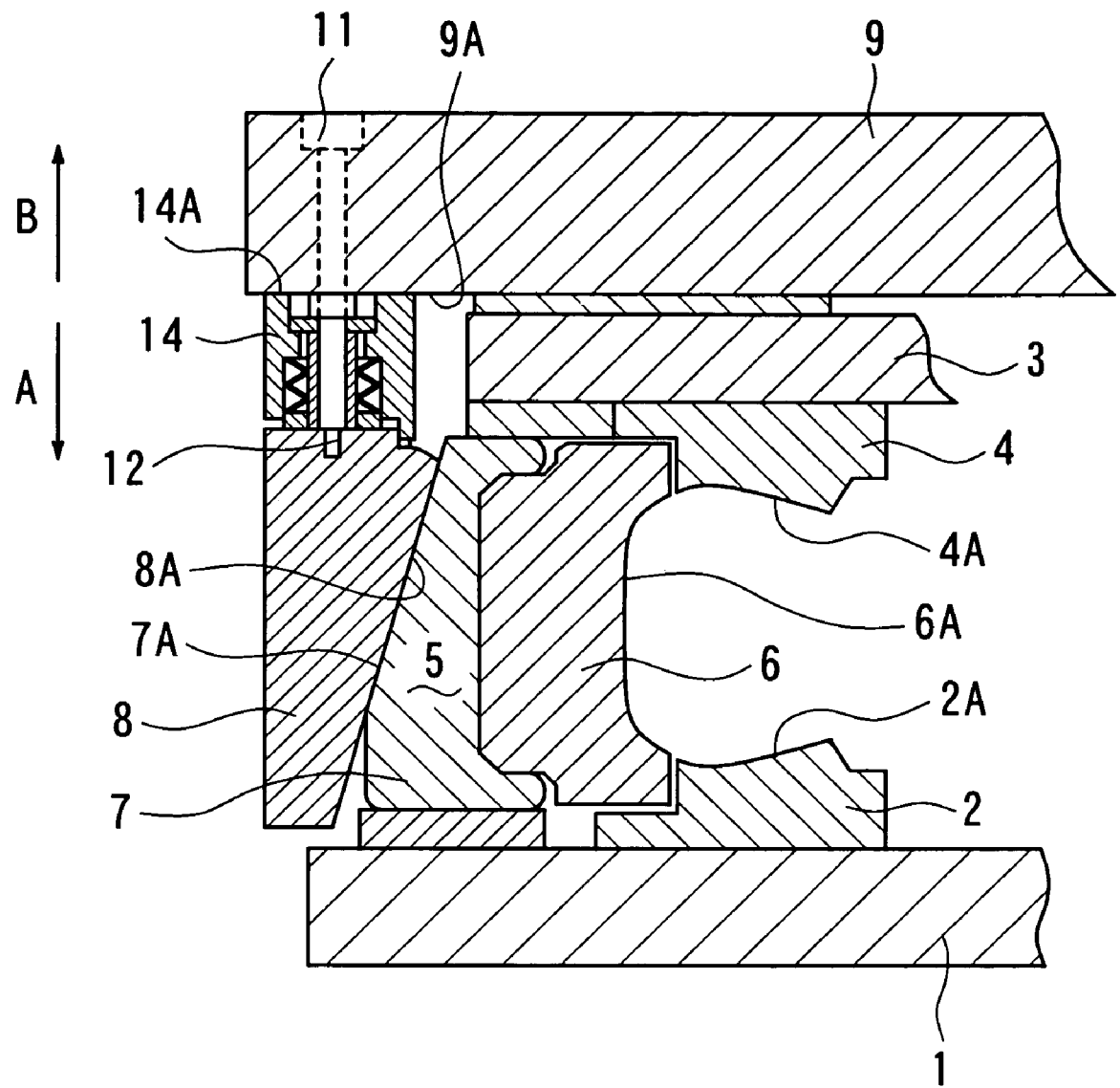
FIG. 1 is a vertical sectional view showing one embodiment of a split-type vulcanizing mold according to the invention.
Figure 6:
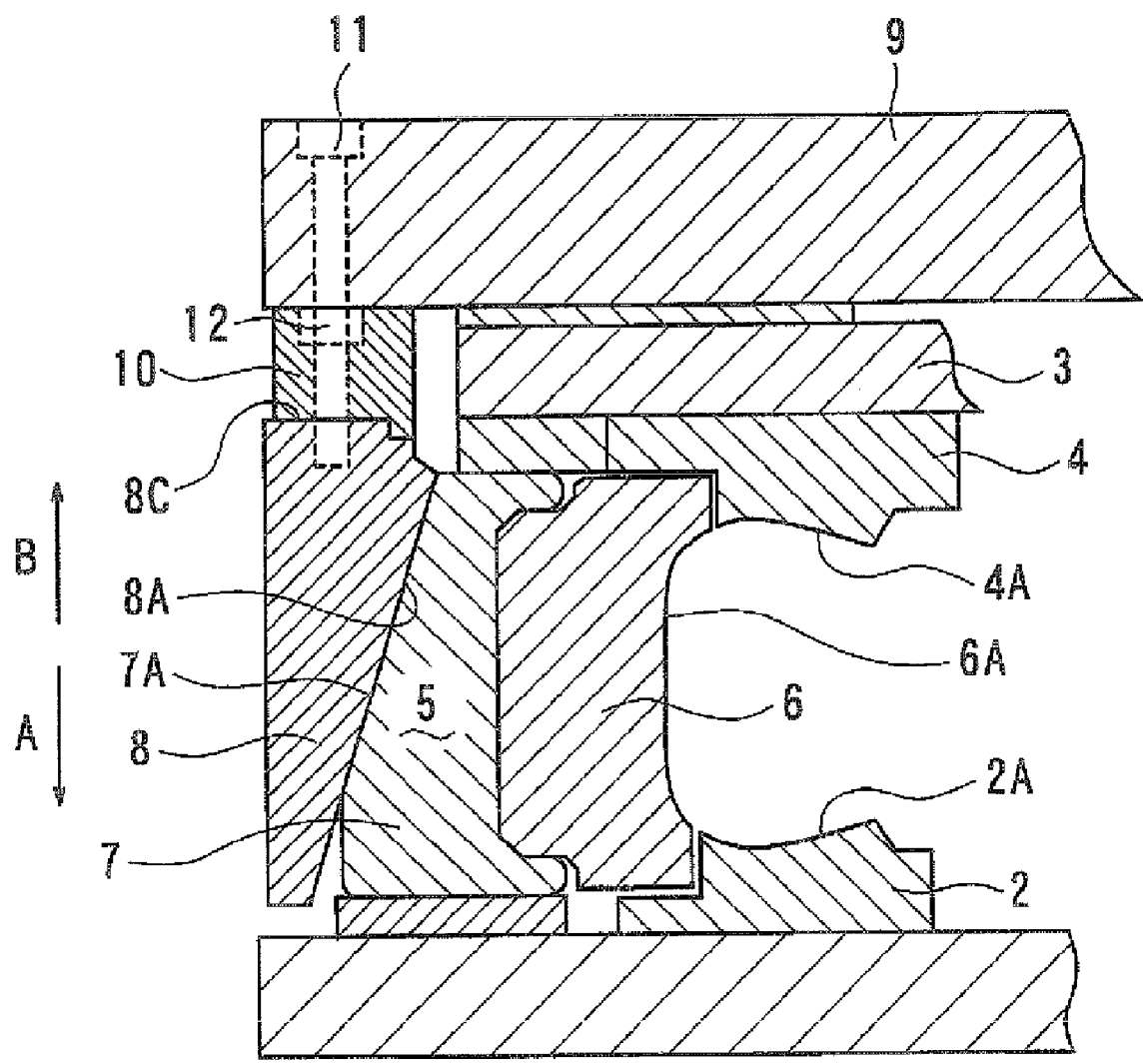
FIG. 6 is a vertical sectional view of a conventional split-type vulcanizing mold.
Figure 7:
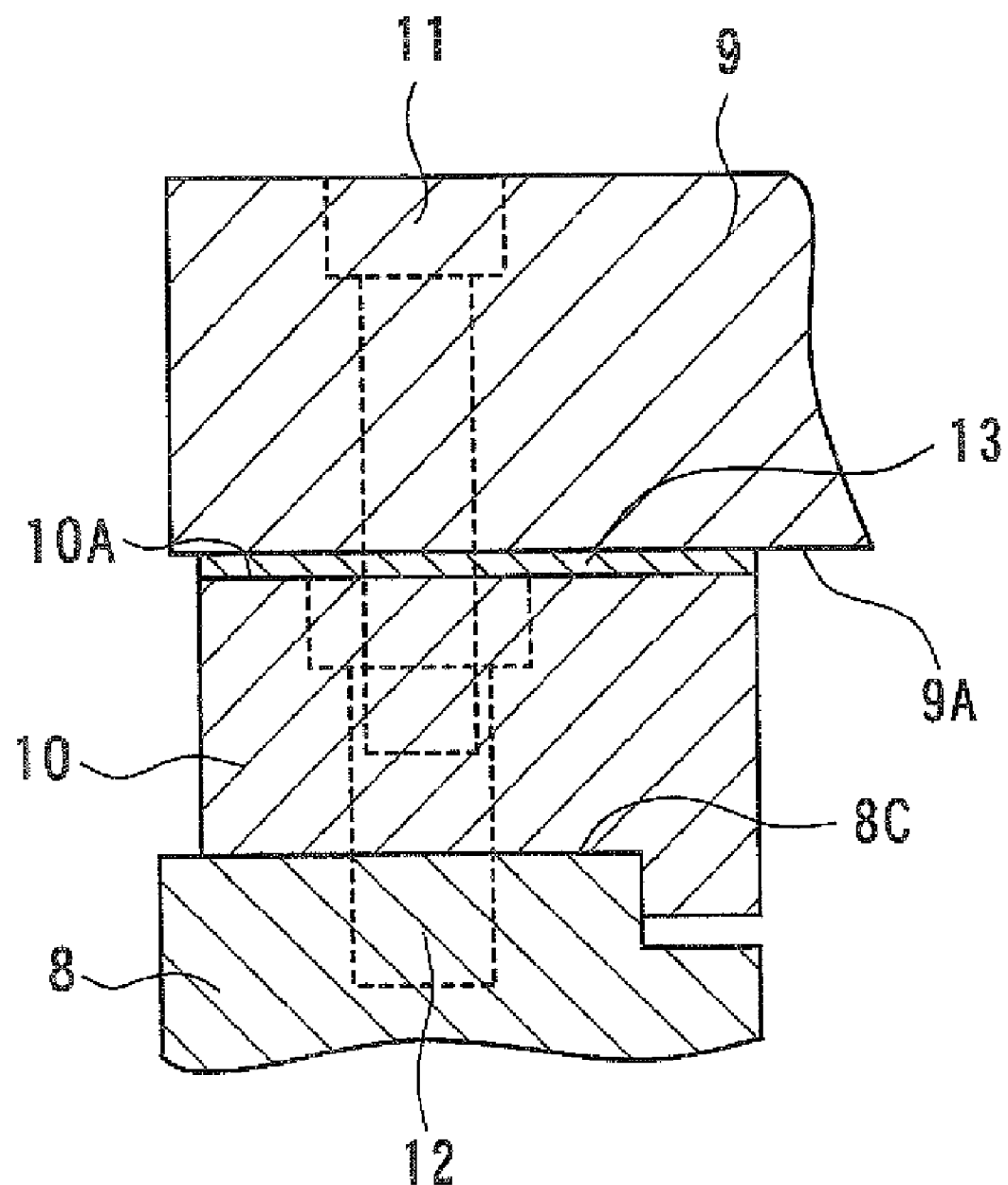
FIG. 7 is a vertical sectional view of the conventional split-type vulcanizing mold, showing a state where shim adjustment is applied thereto.

An embodiment of the invention is described hereinafter with reference to the accompanying drawings. FIG. 1 is a vertical sectional view showing one embodiment of a split-type vulcanizing mold according to the invention. In the figure, parts corresponding to those for the conventional split-type vulcanizing mold shown in FIG. 6 are denoted by like reference numerals for description.

As shown in FIG. 1, a lower side mold 2 is fixed on a lower platen 1, and a molding recess 2A is formed on the top surface of the lower side mold 2. An upper platen 3 is provided above the lower platen 1, and an upper side mold 4 is fixed to the underside surface of the upper platen 3 with a plurality of bolts (not shown). Further, a molding recess 4A is formed on the underside surface of the upper side mold 4. A cylinder (not shown) in vertical posture is provided above the upper platen 3, and an operation of the cylinder causes the upper platen 3 to move vertically to cause the upper side mold 4 to approach and part from the lower side mold 2. A segment mold ring 5 ring-like in shape as a whole is disposed radially outward of the upper side mold 4 and the lower side mold 2. The segment mold ring 5 comprises sector molds 6 arc-like in shape divided in, for example, 9 pieces in the circumferential direction thereof, and sector segments 7 divided similarly in 9 pieces in the circumferential direction thereof, fixed to the radially outer sides of the respective sector molds 6, and a molding recess 6A is formed on the inner surfaces of the respective sector molds 6.

The top surfaces of the respective sector segments 7 are movably supported by the underside surface of the upper platen 3, extending radially outer side of the upper side mold 4.

When the respective sector segments 7 are moved radially inwardly, and the respective sector molds 6 integral with the respective sector segments 7 come to be in close contact with the respective peripheries of the upper side mold 4 and the lower side mold 2, a vulcanization space where a tire is housed to be vulcanized is formed by the sector molds 6, the upper side mold 4, and the lower side mold 2. A structure according to the present embodiment, as thus far described, is identical to that for the conventional split-type vulcanizing mold shown in FIG. 6.

An outer ring 8 annular in shape, surrounding the sector segments 7 is disposed on the radially outer side of the sector segments 7, and a spacer ring 14 annular in shape is attached to the top surface of the outer ring 8 with a bolt 12 so as to be slidable in the directions of the arrows A and B. Further, the top surface of the spacer ring 14 is fixed to the underside surface 9A of a bolster plate 9 with a bolt 11.

Figure 2:
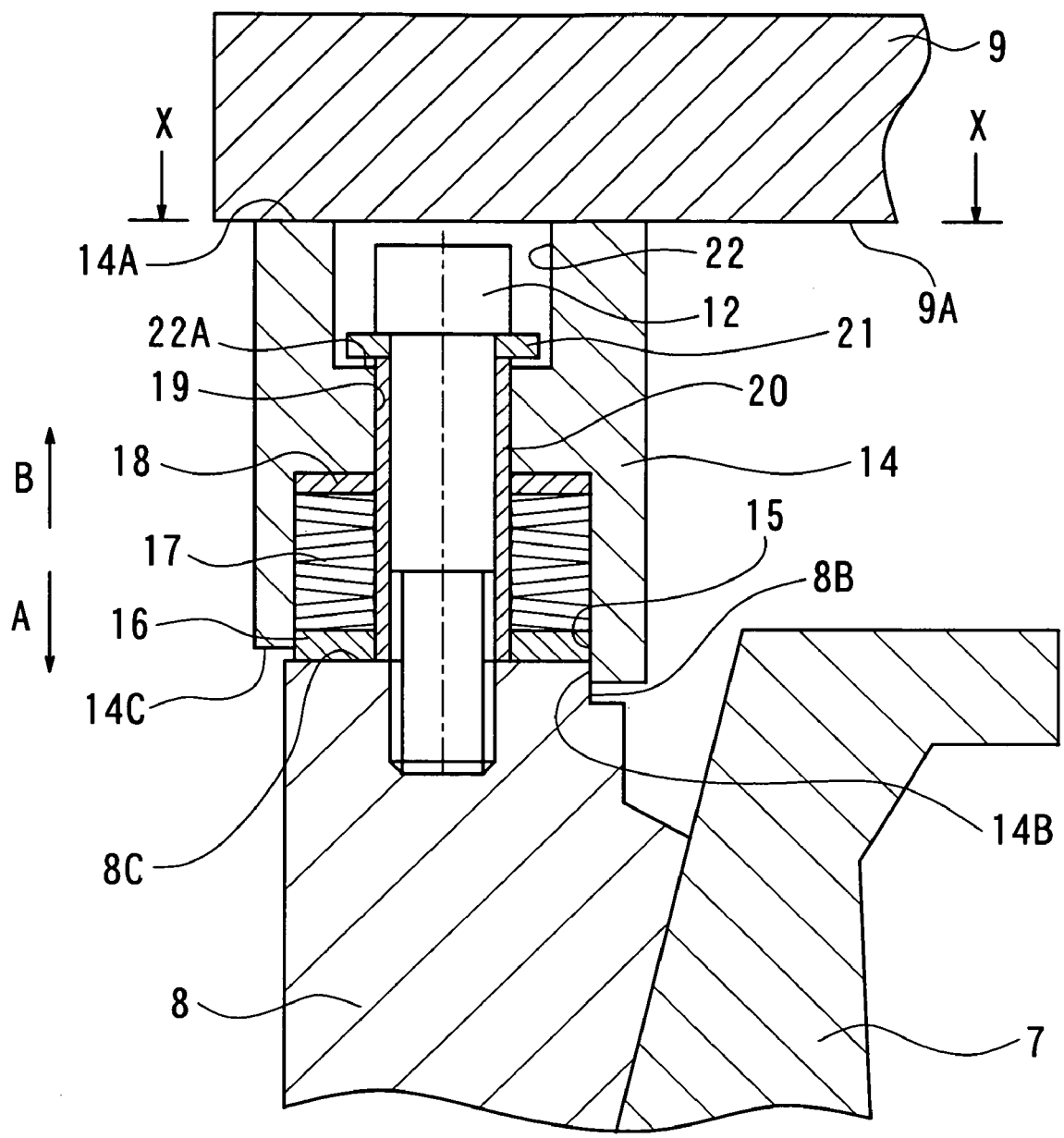
FIG. 2 is an enlarged vertical sectional view of a spacer ring in FIG. 1, showing a state where sector molds are clamped with a predetermined clamping force.

FIG. 2 is an enlarged vertical sectional view of the spacer ring 14, showing a state where the outer ring 8 is pushed down in the direction of the arrow A, and the respective sector molds 6, the upper side mold 4, and the lower side mold 2 are clamped with a predetermined clamping force. As shown in FIG. 2, the spacer ring 14 has an outer periphery 14B, at the lower end thereof, fitted to an inner periphery 8B of the outer ring 8, at an upper end thereof to be slidably engaged with the outer ring 8 relative to the axial directions shown by the arrows A and B. A plurality (for example, 32 pieces) of cylindrical holes 15 that are open to the underside surface 14C of the spacer ring 14 are defined at equal intervals on the circumference of the spacer ring 14, and a lower washer 16, disc springs 17 serving as urging members, and an upper washer 18 are inserted into each of the cylindrical holes 15 in that order from the bottom thereof. The lower washer 16, disc springs 17, and upper washer 18 each are in the shape of a hollow disc, and there are inserted 2 sets of the disc springs 17, back-to-back, each of the disc springs 17 being made up of 2 discs stacked one on top of the other (total 8 pieces of the disc springs 17). The spacer ring 14 is provided with a small-diameter hole 19 open to the respective cylindrical holes 15, defined at equal intervals, and in each of 8 pieces of the cylindrical holes 15 out of the 32 pieces of the cylindrical holes 15, and a bolt 12 is inserted into a collar 20 in the shape of a hollow cylinder, inserted into the small-diameter hole 19 to thereby clamp the collar 20 against the top surface 8C of the outer ring 8 through a washer 21 to be fixed thereto.

Figure 3:
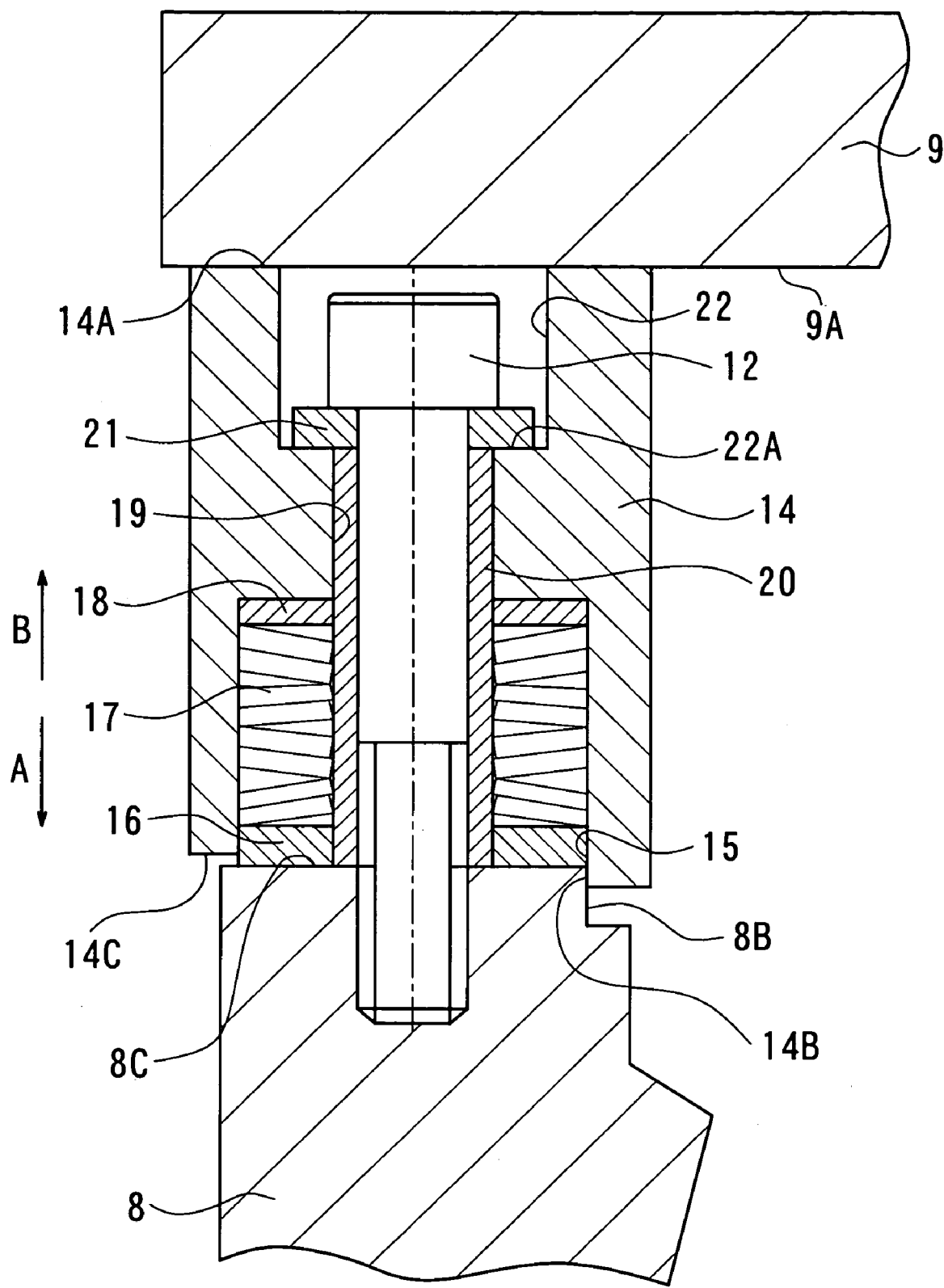
FIG. 3 is another enlarged vertical sectional view of the spacer ring in FIG. 1, showing a state prior to the predetermined clamping force acting on the sector molds.

FIG. 3 is an enlarged vertical sectional view of the spacer ring 14, showing a state prior to the predetermined clamping force acting on the respective sector molds 6. As shown in FIG. 3, a length of the collar 20 in the axial direction, is set so as to cause the disc springs 17 to undergo a little (for example, on the order of 0.5 mm) deflection from a free length thereof. Consequently, when the washer 21 is butted against the collar 20 by tightening up the bolt 12, the washer 21 pushes down an underside surface 22A of a spot-facing hole 22, so that the spacer ring 14 is pushed down in the direction of the arrow A, thereby causing the disc springs 17 to undergo a little deflection. Accordingly, the spacer ring 14 gives a pre-load (for example, on the order of 200 kN) to the outer ring 8 so as to be tightened up by the bolt 12, so that the bolster plate 9, spacer ring 14, and outer ring 8 can be smoothly moved in unison without backlash in the axial direction (in the direction of the arrow A, or B) all the time.

Figure 4:
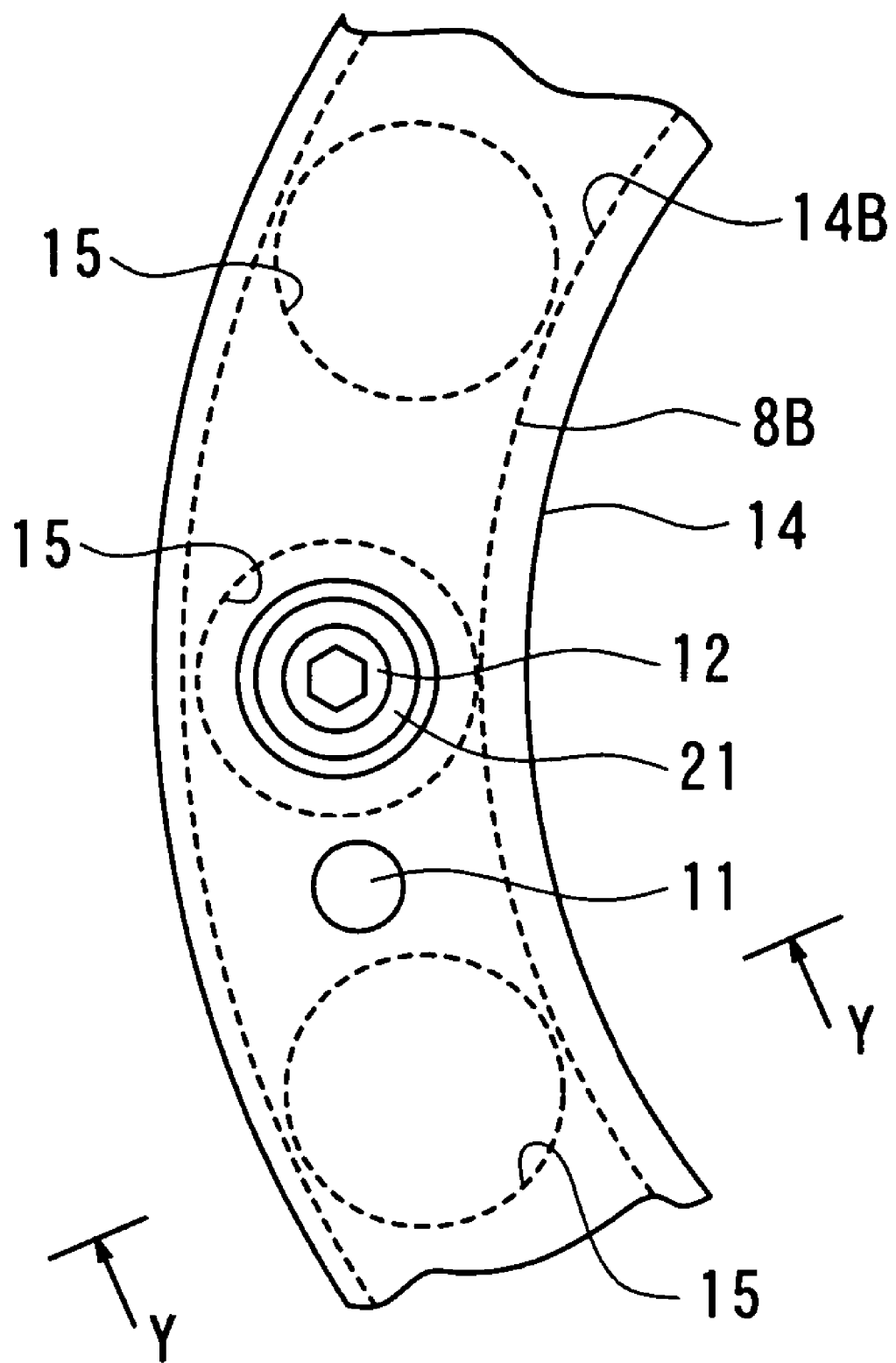
FIG. 4 is a sectional view taken on line X-X in FIG. 2.
Figure 5:
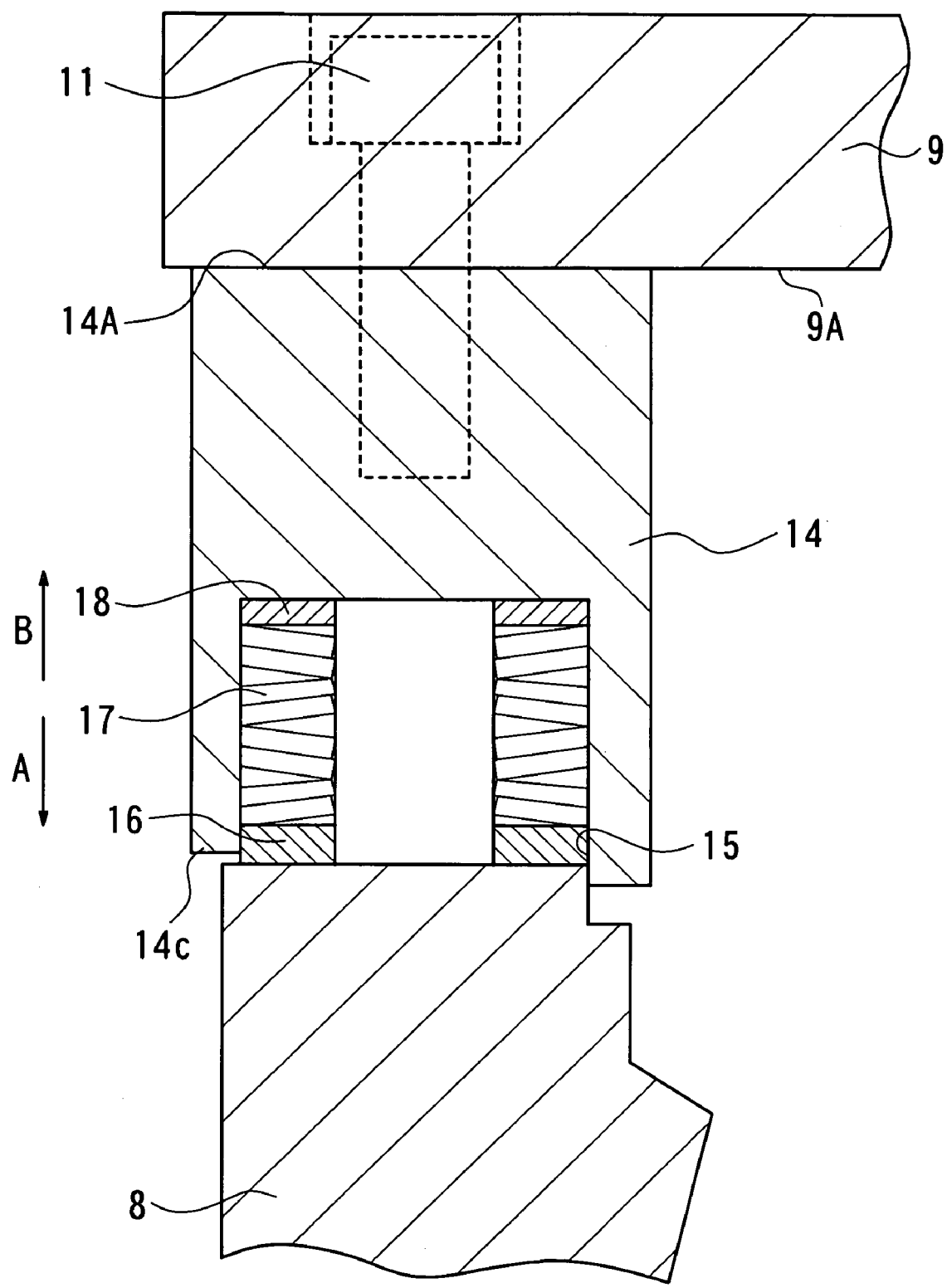
FIG. 5 is a sectional view taken on line Y-Y in FIG. 4.

FIG. 4 is a sectional view taken on line X-X in FIG. 2, and FIG. 5 is a sectional view taken on line Y-Y in FIG. 4. As shown in FIGS. 4, and 5, only the lower washer 16, disc springs 17, and upper washer 18 are inserted into each of remaining 24 pieces of the cylindrical holes 15 out of the 32 pieces of the cylindrical holes 15 that are open to the underside surface 14C of the spacer ring 14, in that order from the bottom thereof, and are not tightened up with the bolt 12.

As shown in FIG. 1, the bolster plate 9 is moved vertically by an elevating mechanism (not shown) to thereby cause the outer ring 8 to move in the axial direction. A sloping face 8A inwardly sloping from the bottom to the top is formed on the inner periphery of the outer ring 8. A sloping face 7A identical in gradient to the sloping face 8A of the outer ring 8 is formed on the outer peripheries of the respective sector segments 7, and the sloping face 7A and the sloping face 8A are linked together with dovetail groove joints so as to be slidably engaged with each other. Accordingly, upon the outer ring 8 moving vertically relative to the upper platen 3, the respective sector segments 7 are moved radially inwardly or outwardly, by a wedging action of the sloping face 7A and the sloping face 8A, in synchronization with each other while being guided by the upper platen 3.

With the present embodiment, the clamping force acting on the respective sector molds 6 is not dependent on a pressing force of the elevating mechanism pushing down the bolster plate 9, but dependent on an urging force of the disc springs 17. Accordingly, if selection is made on the disc springs 17 whose load provides proper clamping force when a deflection of the disc springs 17 is approximately half a deflection thereof at the time of the maximum load, it becomes possible to absorb variation in dimensions regardless of whether the variation in dimensions, at the time of fabricating the mold, is on a plus side or minus side to thereby clamp the respective sector molds 6 with the proper clamping force. Further, since the proper clamping force will vary depending on the kind of a tire, selection may be made as appropriate on the kind of the disc springs for use, the number of discs to be stacked, the number of the disc springs, the number of sets, and so forth, so as to obtain a proper deflection and load. With the present embodiment, the deflection at the time of the maximum load is set to 4 mm such that a proper clamping force (for example, on the order of 700 kN) is obtained when a deflection of the disc springs 17 is 2 mm, equivalent to half the deflection at the time of the maximum load.

More specifically, as the bolster plate 9 is caused to descend from the state where the clamping force is not acting, as shown in FIG. 3, to thereby cause the respective sector molds 6 to undergo reduction in diameter, the spacer ring 14 is pushed down by the bolster plate 9 to thereby descend, causing the disc springs 17 to undergo gradual deflection, so that the clamping force applied to the respective sector molds 6 is increased through the outer ring 8.

As shown in FIG. 2, upon the spacer ring 14 descending to the vicinity of a position where the underside surface face 22A of the spot-facing hole 22 is about 1.5 mm away from the washer 21, the bolster plate 9 stops a descending operation, whereupon the respective sector molds 6 can be clamped with the proper clamping force (for example, 700 kN).

Now, an operation of the present embodiment of the invention, structured as above, is described hereinafter. After a green tire is housed in the vulcanization space, the upper platen 3 is caused to descend, thereby causing the upper side mold 4 to approach the lower side mold 2. Subsequently, the bolster plate 9 is caused to descend in the direction indicated by the arrow A, by the elevating mechanism (not shown). This will cause the outer ring 8 to descend in the axial direction indicated by the arrow A. Because the outer ring 8 and the spacer ring 14 are clamped by applying a pre-load to the disc springs 17, there occurs no rattling in the directions indicated by the arrows A and B, so that the outer ring 8 and the spacer ring 14, together with the bolster plate 9, can smoothly descend in unison. Upon the outer ring 8 descending relative to the upper platen 3, the respective sector segments 7 are moved radially inwardly, by the wedging action of the sloping face 7A and the sloping face 8A, in synchronization with each other while being guided by the upper platen 3, and undergoing reduction in diameter. Upon an increase in load applied to the outer ring 8, due to the sector segments 7 undergoing the reduction in diameter, the spacer ring 14 is pushed by the bolster plate 9 to thereby descend, causing the disc springs 17 to undergo gradual deflection, so that the clamping force applied to the respective sector molds 6 through the outer ring 8 keeps increasing.

As shown in FIG. 2, upon the spacer ring 14 descending to the vicinity of the position where the underside surface 22A of the spot-facing hole 22 is about 1.5 mm away from the washer 21, the bolster plate 9 stops the descending operation, whereupon the respective sector molds 6 will have been clamped with a clamping force in the neighborhood of the proper clamping force (for example, 700 kN). As the respective sector molds 6 integral with the respective sector segments 7 come to be in close contact with the respective peripheries of the upper side mold 4 and the lower side mold 2 at this point in time, a vulcanization treatment is subsequently applied to a green tire by causing the vulcanizing medium at a high temperature and high pressure to act thereon.

What is claimed is:

1. A split-type vulcanizing mold comprising:
   a lower side mold;
   an upper side mold capable of approaching and parting from the lower side mold;
   a segment mold ring comprising a plurality of segments arc-like in shape, capable of moving in a radial direction thereof, and coming into contact with the upper side mold and the lower side mold upon the segments moving toward the radially inner side;
   an outer ring provided on the radially outer side of the segment mold ring, so as to be movable in the axial direction thereof, for causing the segment mold ring to move radially;
   a bolster plate for causing the outer ring to move in the axial direction thereof through a spacer ring; and
   urging members inserted between the spacer ring and the outer ring and having an urging force substantially equivalent to a clamping force of the mold at the time of vulcanization, wherein said spacer ring is slidably installed on a top surface of the outer ring though said urging members.

2. The split-type vulcanizing mold according to claim 1, wherein the urging members are provided with a predetermined pre-load.

3. The split-type vulcanizing mold according to claim 1, wherein said urging members are set to provide proper clamping force when a deflection of the urging members is approximately half of the maximum deflection thereof.

4. The split-type vulcanizing mold according to claim 2, wherein said urging members are set to provide proper clamping force when a deflection of the urging members is approximately half of the maximum deflection thereof.

* * * * *